(12) United States Patent
Ball

(10) Patent No.: US 7,667,087 B2
(45) Date of Patent: Feb. 23, 2010

(54) SOIL AND WATER REMEDIATION METHOD AND APPARATUS

(75) Inventor: Raymond G. Ball, Newton, MA (US)

(73) Assignee: Enchem Engineering, Inc., Newton, MA (US)

( * ) Notice: Subject to any disclaimer, the term of this patent is extended or adjusted under 35 U.S.C. 154(b) by 34 days.

(21) Appl. No.: 11/767,264

(22) Filed: Jun. 22, 2007

(65) Prior Publication Data

US 2008/0008535 A1    Jan. 10, 2008

Related U.S. Application Data

(60) Provisional application No. 60/805,894, filed on Jun. 27, 2006.

(51) Int. Cl.
*B09C 1/00* (2006.01)

(52) U.S. Cl. .................... 588/320; 405/128.75

(58) Field of Classification Search ................ 588/320, 588/405; 405/128.1, 128.7, 128.75
See application file for complete search history.

(56) References Cited

U.S. PATENT DOCUMENTS

| 6,582,611 | B1 | 6/2003 | Kerfoot | |
|---|---|---|---|---|
| 6,805,798 | B2 | 10/2004 | Kerfoot | |
| 6,872,318 | B2 | 3/2005 | Kerfoot | |
| 7,175,770 | B2 | 2/2007 | Whisman, III | |
| 7,264,419 | B2 | 9/2007 | Bowman et al. | |
| 7,270,499 | B2 | 9/2007 | Greenberg | |
| 2003/0029792 | A1 | 2/2003 | Kerfoot | |
| 2003/0207440 | A1* | 11/2003 | Smith | 435/266 |
| 2004/0165956 | A1* | 8/2004 | Greenberg | 405/128.75 |
| 2004/0197150 | A1* | 10/2004 | Bruell et al. | 405/128.5 |
| 2004/0238459 | A1* | 12/2004 | Whisman, III | 210/759 |
| 2005/0067356 | A1 | 3/2005 | Bowman et al. | |
| 2005/0258110 | A1 | 11/2005 | Block et al. | |
| 2006/0054570 | A1 | 3/2006 | Block et al. | |
| 2008/0264876 | A1 | 10/2008 | Block et al. | |

OTHER PUBLICATIONS

Block, Philip A., Novel Activation Technologies for Sodium Persulfate in Situ Chemical Oxidation, Proceedings of the Fourth International Conference on the Remediation of Chlorinated and Recalcitrant Compounds, 2004, 8 pages, http://www.geo-log.de/uploads/media/novel_persulfate_activation_technologies.pdf.

(Continued)

*Primary Examiner*—John Kreck
(74) *Attorney, Agent, or Firm*—Grossman Tucker Perreault & Pfleger PLLC

(57) ABSTRACT

Disclosed is a method, apparatus and system for the remediation of contaminated soils, groundwater and water. A combination of reagents such as persulfate and ozone or persulfate, ozone and hydrogen peroxide may be used to enhance destruction of organic contaminants. Reagents may be injected into the smear zone to trap and destroy volatile compounds that may otherwise escape treatment.

25 Claims, 6 Drawing Sheets

OTHER PUBLICATIONS

Ruscito, Rick, P.E. et al, Klozür™ Activated Persulfate, Department of Environmental Protection, Feb. 25, 2005, 12 pages.
Geoprobe Systems—Why use the HPT System at the Clarks, NE well field Site?,HPT Hydraulic Profiling Tool, Spring 2008, 1 page.
ChemRem—Hydrogen Peroxide and Klozur Persulfate—Klozur Brand Persulfate and Activation methods, Internet date May 12, 2008, http://www.chemrem.com/Klozur-Persulfate.html, 3 pages.
House, Kinetics and Mechanism of Oxidations by Peroxydisulfate, Victoria University of Wellington, Welllington, New Zealand, Aug. 8, 1961, 185-203.
Vandersmissen, Advanced Oxidation Processes in Ozonated Water Systems: an Experimental and Theoretical Study, Katholieke Universiteit Leuven Faculteit Wetenschappen Departement Chemie Afdeling ZMoleculair Design en Syntheses, Jan. 2008, 240 pages.

* cited by examiner

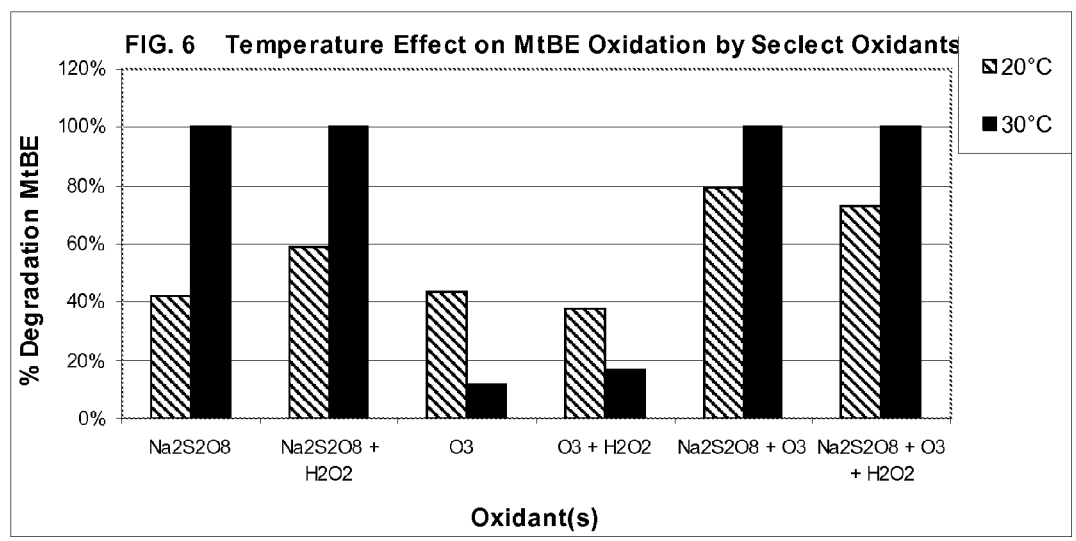

SOIL AND WATER REMEDIATION METHOD AND APPARATUS

RELATED APPLICATION

This application claims benefit of U.S. Provisional Patent Application Ser. No. 60/805,894, titled "SOIL AND WATER REMEDIATION METHOD AND APPARATUS" filed Jun. 27, 2006, which is hereby incorporated by reference herein.

BACKGROUND

1. Field of Invention

The invention relates to methods and apparatuses for the remediation of contaminated water and/or soil and, in particular, to the reduction of the concentration of organic compounds in water and/or soil.

2. Discussion of Related Art

Both State and Federal governments have issued regulations governing hazardous organic and inorganic contaminants in the environment. Subsurface soil and groundwater contamination with organic and inorganic contaminants has been a concern since the 1970's. Action levels and clean-up standards have been promulgated by both State and Federal government for numerous organic and inorganic contaminants.

Regulated organic contaminants in the subsurface environment include, but are not limited to: polychlorinated biphenyls (PCBs); chlorinated volatile organic compounds (CVOCs) such as tetrachloroethene (PCE), trichloroethene (TCE), trichloroethane (TCA), dichloroethene (DCE), vinyl chloride; fuel constituents such as benzene, ethylbenzene, toluene, xylene, methyl tert butyl ether (MTBE), tertiary butyl alcohol (TBA), polynuclear aromatic hydrocarbons (PAHs), ethylene dibromide (EDB); pesticides such as (but not limited to) DDT; and herbicides such as (but not limited to) silvex. Regulated inorganic contaminants in the subsurface environment include, but are not limited to: heavy metals, such as lead, arsenic, chromium, mercury, silver. State and Federal regulations that govern these subsurface contaminants outline a protocol for subsurface investigation to identify the extent of contamination, identification of the human health and ecological risk posed by the contaminants, development of remedial action alternatives for reducing or eliminating any significant risk posed by the contaminants, and selection and implementation of remedial measures to achieve the remediation goals.

In situ (ISCO) or ex situ (ESCO) chemical oxidation technology has emerged as a prominent remedial measure due to its cost-effectiveness and timeliness in achieving remediation goals. ISCO technology can be used alone or in combination with other complementary technologies, such as soil vapor extraction (SVE) for removal of volatile organic compounds from the unsaturated zone, multi-phase extraction for removal of organic contaminant from the unsaturated and saturated zones, or vertical recirculation systems in the saturated zone.

The literature regarding ISCO or ESCO reports the use of a strong oxidizing agent to treat contaminated soil and water by chemically degrading recalcitrant and hazardous chemicals. Such oxidants include hydrogen peroxide, Fenton's reagent, ozone, permanganate, persulfates, and other peroxygens.

SUMMARY OF INVENTION

The subject matter of this application may involve, in some cases, interrelated products, alternative solutions to a particular problem, and/or a plurality of different uses of a single system or article.

In one aspect, a method of reducing the concentration of an organic contaminant in soil is provided, the method comprising introducing persulfate and ozone or persulfate, ozone and hydrogen peroxide into a saturated zone to oxidize at least a portion of the organic contaminant.

In another aspect a method of reducing the concentration of an organic contaminant in soil and/or groundwater is provided, the method comprising introducing a first oxidant into a saturated zone to produce a radius of influence, introducing a second oxidant into a region of a smear zone, the region being vertically aligned with a portion of the radius of influence, and oxidizing at least a portion of the organic contaminant in the saturated zone.

In another aspect a system for remediating contaminated soil and/or groundwater is provided, the system comprising a first well comprising at least a first injection port, the injection port constructed and arranged to inject an oxidant into the saturated zone to form a radius of influence in the saturated zone, and a second well comprising at least a second injection port, the second injection port constructed and arranged to inject an oxidant into the smear zone in a region vertically aligned with at least a portion of the radius of influence.

In another aspect a method of reducing the concentration of an organic contaminant in water is provided, the method comprising introducing persulfate and ozone concurrently or persulfate, ozone and hydrogen peroxide concurrently into the water to oxidize at least a portion of the organic contaminant.

In another aspect a method of remediating contaminated soil and/or groundwater is provided, the method comprising injecting a first oxidant into the smear zone, injecting a second oxidant into the saturated zone under pressure to produce a mounded groundwater table in the smear zone, and mixing the first and second oxidants in the mounded groundwater table to oxidize contaminants in the smear zone.

BRIEF DESCRIPTION OF DRAWINGS

In the drawings, FIG. 1 provides a plan view of an embodiment of a groundwater treatment system;

FIG. 6 is a bar graph showing experimental results.

DETAILED DESCRIPTION

Figure 1:
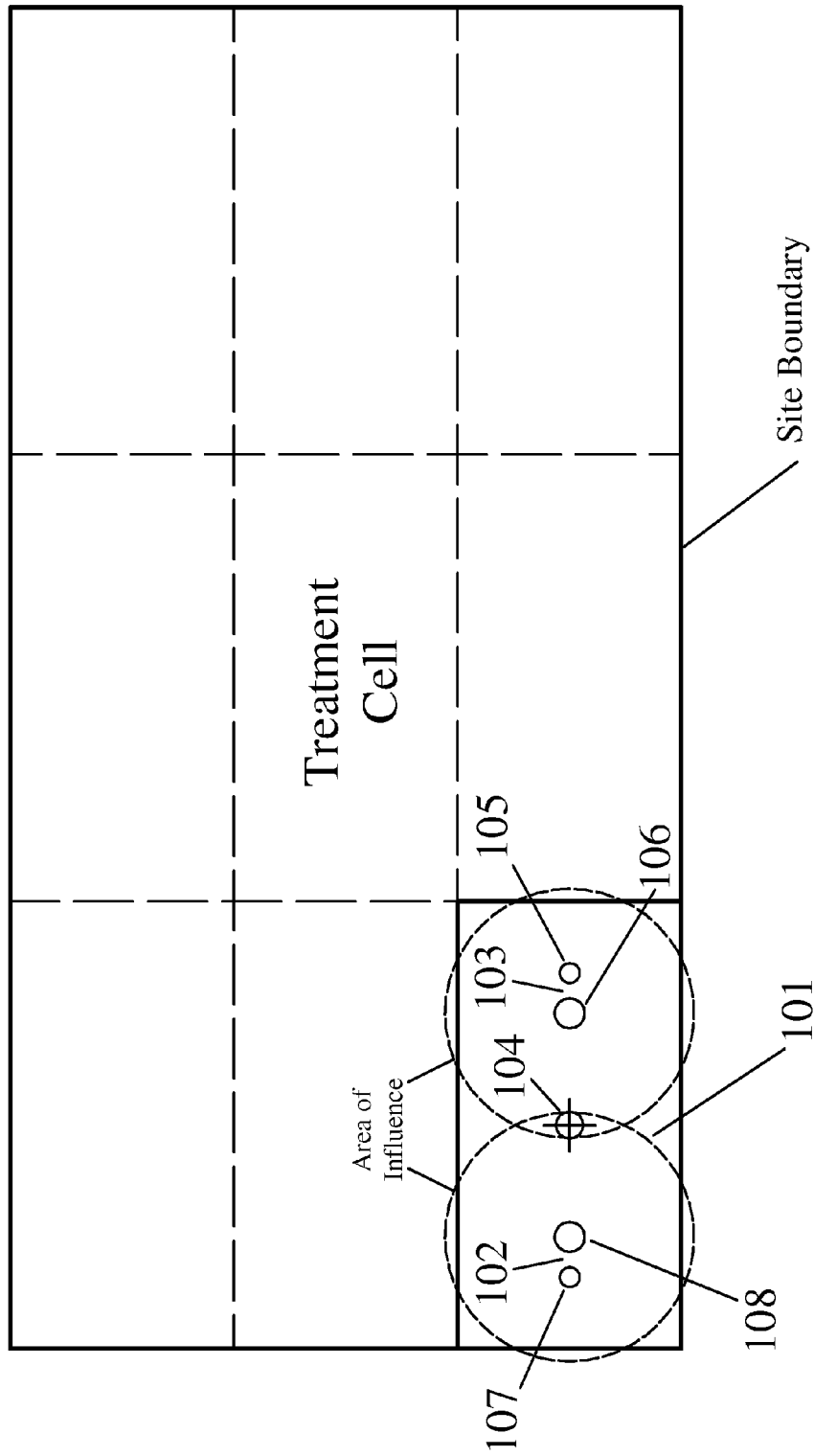

A variety of oxidizers are known to be useful in remediating groundwater and soil contaminated with organic compounds. Typically, however, an operator chooses a single oxidizer based on, for example, the soil type or contaminant class. Preferred oxidizers in the field are those that have an ability to permeate through the subsurface either above the groundwater table (unsaturated zone) or below the groundwater table (saturated zone) while interacting with target compounds throughout the entire zone of contamination. Oxidizing species, such as peroxide, ozone, and hydroxyl radicals can provide powerful oxidation but have relatively short life times within the subsurface. Persulfate radicals typically persist for greater time periods in the environment.

Ozone may be applied to the unsaturated zone using vent wells for ozone injection and SVE technology whereby a vacuum is induced in the subsurface to distribute the ozone throughout the area of contamination. Ozone can also be applied to the saturated zone using sparging techniques whereby ozone is diffused into the groundwater directly or added to air and sparged into the groundwater.

In one aspect of the invention, a method for reducing the concentration of organic compounds in soil, water and/or groundwater is provided. Contaminated soil in the saturated zone, smear zone and/or unsaturated zone can be remediated to concentrations that meet local, federal or other mandated or chosen levels. Water and/or soil may be decontaminated in situ or ex situ. The method may involve the co-introduction of two or more oxidants, for example, persulfate and ozone, into any of the saturated, unsaturated and smear zones. An additional oxidant such as hydrogen peroxide may also be used. Results show that the co-introduction of these oxidants provides greater benefits than using them independently. Strong oxidizing compounds can exhibit greater persistence in the groundwater when used concurrently with other oxidizers.

Different types of soils may be treated including, for example, sand, rock, sediment, loam and clay. Waters that can be treated include, for example, groundwater, waste water, process water and runoff.

Organic contaminants that can be remediated include, but are not limited to, volatile organic compounds, semi-volatile organics (SVOC's) polychlorinated biphenyls (PCBs); chlorinated volatile organic contaminants (CVOCs), benzene, ethylbenzene, toluene, xylene (BTEX), methyl tert butyl ether (MTBE), tertiary butyl alcohol (TBA), polynuclear aromatic hydrocarbons (PAHs), ethylene dibromide (EDB); pesticides and herbicides such as DDT and silvex, tetrachloroethene (PCE), trichloroethene (TCE), trichloroethane (TCA), dichloroethane (DCA), methylene chloride, carbon tetrachloride, dichloroethene (DCE), vinyl chloride, light non-aqueous phase liquids (LNAPL) and fuels such as gasoline, diesel fuel, fuel oils (including #2, #4 and #6) and jet fuels (e.g., JP4 and JP5).

In another aspect a method and system are provided for reducing the concentration of organic compounds in soil and/or groundwater. An oxidant mixture such as persulfate and ozone or persulfate, ozone, and hydrogen peroxide may be introduced into the saturated zone, resulting in a radius of influence in which organic contaminants are oxidized and reduced in concentration. Above the radius of influence, another oxidant (which may be the same as the first) is introduced into the smear zone. This second oxidant can attack any contaminants present in the smear zone and may also prevent contaminants from escaping through the smear zone if and when they are volatilized in the saturated zone. For instance, heat and/or the introduction of gases may remove some contaminants from the saturated zone rather than destroy them; however, the formation of a gaseous oxidant blanket in the smear zone can trap and destroy these escaped compounds before the compounds can emerge from the saturated zone into the smear zone or the unsaturated zone.

"Persulfate" includes both monopersulfate and dipersulfate. Typically, persulfate is in the form of aqueous sodium, potassium or ammonium dipersulfate or sodium or potassium monopersulfate or a mixture thereof.

"Saturated zone" refers to the region of the soil profile that is consistently below ground water level.

"Unsaturated zone" refers to the region of the soil profile that is consistently above ground water level.

"Smear zone" refers to the region of the soil profile through which the ground water level fluctuates, typically on a seasonal basis. The smear zone is the region that when the ground water is at its highest would be considered saturated and when the ground water is at its lowest would be considered unsaturated.

"Organic contaminant" is an organic compound that is not native to the soil or water in which it is found. Organic compounds may include, for example, hydrocarbon-based fuels, solvents, pesticides, herbicides, PCBs, volatile hydrocarbons, semi-volatile hydrocarbons, chlorinated volatile hydrocarbons, BTEX and MTBE.

"Radius of influence" describes the radius around a well or other injection point defining an area throughout which an adequate amount of reactant can be introduced to oxidize at least some of the organic contaminants present.

In one embodiment, a method is provided for reducing the amount of organic contaminants in a soil or water sample either in situ or ex situ. At least a portion of organic contaminant present can be oxidized. "At least a portion" means at least some of the molecules present in the sample being treated will be oxidized. It does not mean that a portion of a specific molecule is oxidized. "Soil" as used herein includes soil, sediment, clay and rock.

It has been found that a combination of the two water soluble reagents, persulfate and ozone, provides a level of compound destruction that is superior to that of either one of the reagents used without the other, even at much greater concentrations. Persulfate is a preferred oxidant for remediating soil for several reasons including that it has minimal reactivity with natural soil components and therefore all, or most, of the oxidizing power of the reagent is available to oxidize organic contaminants. Persulfate may be a long-lived oxidant, and this increased longevity can result in an increased radius of influence and can help to minimize the required number of injection points throughout the contaminated area. Persulfate may be introduced to water or soil as a liquid, typically in the form of an aqueous solution of sodium persulfate. Ozone may be provided as a gas or as a liquid, for example, an aqueous solution. In some embodiments, a third reagent, hydrogen peroxide, may be added as well. Hydrogen peroxide is typically used in solution form and in some embodiments may be mixed with persulfate.

It is believed that use of ozone in conjunction with persulfate may result in a high rate of conversion to persulfate radicals that can provide for a wider, more intense, radius of influence. If hydrogen peroxide is employed along with ozone, a high rate of conversion to hydroxyl radicals may result and may also contribute to a wide radius of influence. Known processes may initiate a site clean-up by injecting large quantities of a single oxidant such as an aqueous solution of persulfate or hydrogen peroxide. Persulfate and hydrogen peroxide, when injected individually, however, do not react sufficiently fast enough relative to the rate of injection, and it is believed that the large volume of the solution that is typically injected simply displaces much of the contaminated ground water before the persulfate or hydrogen peroxide can react with any contaminants which the groundwater may contain. By including ozone prior to, or concurrently with, the injection of the aqueous persulfate or hydrogen peroxide, it has been found that much of the contaminant mass can be oxidized before it is displaced. Ozone itself does not show great persistence and cannot be provided, by itself, in molar quantities great enough to destroy significant levels of contaminants, such as MTBE in soil or groundwater, in a short period of time. When ozone by itself is diffused or sparged into groundwater, treatment occurs over several months as opposed to several days. In combination with persulfate or hydrogen peroxide, however, ozone provides improved levels of contaminant destruction. It has also been found that a discontinuous pumping procedure that allows for "rest periods" when no solution is injected can provide for greater destruction levels and less displacement of contaminated water.

In some embodiments, the persulfate and, optionally, hydrogen peroxide, may be injected into the water, ground water (saturated zone), smear zone or unsaturated zone via a first injector. Ozone may be injected via a second injector in the same region (or another region) as the first injector. Ozone may be formed on site and in many cases may be generated at a concentration from about 1% to 10% by volume. Ozone and air may be sparged at rates that provide for a preferred radius of influence and in some cases the radius of influence may be at least as broad as that of a co-oxidant that may be introduced concurrently to the site. Ozone can be diffused into groundwater or the smear zone at flow rates of up to or greater than 80 scfh. In preferred embodiments, sparge rates may be, for example, 0.1-20 scfm per injection well. Together, the ozone and persulfate and, optionally, hydrogen peroxide, can provide a combined radius of influence that provides greater destruction of compounds over a greater area than is realized using either compound independently, even when used independently at greater concentrations.

When treating ex situ samples such as excavated soil, waste water or process water, methods of introducing reagents may be simplified and reagents such as oxidants, pH buffers and/or surfactants may simply be added to the processor at the desired time in the process. Nonetheless, it is often preferred to include both persulfate and ozone to provide desired results. Hydrogen peroxide may also be included to improve destruction rates and increase the spectrum of compounds that can be destroyed in many ex situ samples.

Destruction rates, either in situ or ex situ, may also be aided by raising the temperature of the reaction. For instance, the temperature may be raised to greater than 30° C., greater than 40° C., greater than 50° C., greater than 70° C. or greater than 90° C. However, cooler temperatures may also be used with the method when, for example, volatilization of compounds should be minimized or when mobile compounds such as MTBE are being targeted. In these lower temperature applications, effective destruction levels can be obtained at temperatures less than 40° C., less than 30° C. or less than or equal to 20° C.

Reagents may be introduced into a soil or ground water sample using a well that may be vertically, horizontally or otherwise oriented. Wells may be temporary, semi-permanent or permanent and may be sealed in the bore hole using substances known to those skilled in the art such as bentonite, grout or cement. A well may be telescoping and may include one or more conduits for transporting reagents from aboveground supplies to the target site, such as the saturated zone or the smear zone. Conduits for different reagents may be coaxial with each other or may run through distinct conduits in the well. Conduits may be made of, or coated with, a non-corrosive material such as stainless steel, alloys, PTFE, PVC or CPVC. A second reagent may be introduced through a different well than the first and may deliver the reagent at a different depth than the first. However, the second well may be positioned so that the radius of influence of the second injection point substantially overlaps the radius of influence of the first injection point. For example, with vertically installed wells, the vertical axis of the second well may be close to the vertical axis of the first well. In some embodiments the two wells may be within 20', 15', 10', 5', 2' or 1' of each other. These two wells form a couplet.

Persulfate and ozone may be used at approximately equal molar ratios or the molar ratio of persulfate to ozone may be, for example, greater than or equal to 10:1, 100:1, 200:1, 500:1, 1000:1, 2000:1 or 5000:1. If hydrogen peroxide is used, the molar ratio of peroxide to ozone may also be, for example, greater than or equal to 1:1, 1:2, 2:1, 5:1 or 10:1. The reagents may be supplied at any effective concentration that may be determined, in part, from the type of soil, groundwater characteristics, type of contaminant, concentration of contaminant, and the vehicle used to transport the reagent. In some preferred embodiments, persulfate may be used at a concentration of from 500 mg/L to 250,000 mg/L; soluble ozone may be used at a concentration range of from 1 mg/L to 300 mg/L; and hydrogen peroxide may be used at a concentration of from 500 mg/L to 250,000 mg/L. Ozone gas may be diffused in pure oxygen over an effective range, typically about 2-10%.

The reagents used, for example ozone, persulfate and/or hydrogen peroxide, may be introduced to the target site simultaneously or sequentially. When introduced sequentially, the time between sequential injections should preferably not be so great that the activity of the first-injected reagent has been significantly reduced before providing the second reagent. Improved results are apparent in many cases when oxidants are concurrently active at the site. In some preferred embodiments, the temperature at the reaction site is kept at or below 20° C. This may be done by limiting oxidant selection to persulfate and ozone or by limiting the supply of hydrogen peroxide to a threshold that keeps the reaction temperature at or below about 20° C.

In another aspect of the invention, a system and method are provided for reducing the concentration of organic contaminants in soil, water and groundwater. Reagents may be applied to different soil zones to provide for more complete destruction of contaminants.

With remediation systems that utilize sparging with either air or other gases in the saturated zone there is the potential to volatilize some organics into the unsaturated zone before they can be oxidized. In addition, when adding oxidants to the saturated zone, heat may be produced, causing volatile organics to be driven from the saturated zone into the smear zone and/or unsaturated zone. Some of these contaminants may be removed using soil vapor extraction (SVE) techniques, but these methods require use of an induced vacuum and associated piping network over a large surface area with above ground off-gas treatment such as granular activated carbon or thermal oxidation. The system described herein can trap and destroy many or all of these volatile organics with or without the addition of SVE.

In some embodiments, the saturated zone, smear zone, and/or unsaturated zone may be pre-oxidized with a first oxidant prior to applying a second oxidant for the purpose of destroying contaminants. This step may help to improve the completeness of chemical destruction in later steps.

The pH of an oxidant solution may be controlled to enhance, for example, stability and/or reactivity. In some embodiments a preferred pH range is 5.0-9.0 and in many cases 5.0-7.0. In some cases, a more acidic pH may be used during the reaction but it is usually preferable to restore the pH to above about 5.0 at the end of the project. The pH of a hydrogen peroxide solution may be controlled using, for example, a phosphate buffer. Once a target soil is chosen, an optimal pH for various oxidant solutions can be determined in the field or lab by those of skill in the art.

In addition to the desire to have longer lived reactive species to promote greater radial influence from the point of injection, there is also a desire to reduce the number of injection events required to achieve cleanup standards. Typically, using known techniques, two or more injection events are required to achieve the required reduction in contaminant concentration to meet target clean-up goals. There are at least two reasons for this: 1) contaminants trapped in the "smear zone" are not targeted by existing ISCO technology, and 2) contaminants and oxidants are slow to diffuse into and out of micro-pores within the saturated zone, especially in fine grained soils. The system described herein can address these issues, as well as others.

In one set of embodiments a first reagent is introduced into the saturated zone. The reagent may be any compound or combination of compounds that can reduce the concentration of organic contaminants. The reagent may be an oxidant. Oxidants may include, for example, persulfate, hydrogen peroxide, permanganate, peroxygens, Fenton's reagent, ozone, and other compounds capable of destroying the target contaminant.

This reagent, or combination of reagents, may be introduced as a liquid, a gas or an atomized suspension. The reagent typically produces a radius of influence within which contaminants may be destroyed at efficiencies of >80%, >90%, >95% or >99%. Some contaminants may escape the saturated zone and may even be driven from the saturated zone by the chemical treatment. A second reagent may be injected into the smear zone above the zone formed by the radius of influence of the first reagent to produce a secondary blanket. SVE techniques may also be employed but may not be necessary.

By introducing a second reagent (which may be the same or a different compound or compounds) into the smear zone, a blanket of reagent is formed above the groundwater that can capture and destroy contaminants (typically volatile and semi-volatile compounds) that may emerge from the saturated zone before the first reagent has been able to break them down. In this manner, these contaminants may never reach the unsaturated zone or surface, and most or all of the escaping compounds can be destroyed in situ. This may result in lower disposal costs compared to SVE and may also result in a reduction of volatilized materials that might otherwise escape to the atmosphere. In addition, when an oxidant is applied in excess of the oxidant demand to the smear zone, the excess oxidant may infiltrate the saturated zone at a later time to provide additional oxidation of saturated zone contaminants. Furthermore, the technology can be used to directly destroy contaminants that are resident in the smear zone. As the groundwater level moves up and down through the smear zone over time, some classes of contaminants, such as light non-aqueous phase liquids (LNAPL), may float on top of the water and move with it. This can result in a high concentration of these contaminants in the smear zone, making this region an important target for remediation.

Another advantage of injecting a layer of an oxidant, such as ozone, into the smear zone is that it can result in a state of "hypersaturation" in groundwater. While ozone typically will diffuse out of solution and leave a less effective aqueous solution behind, the presence of a gaseous ozone blanket will, according to Henry's Law, reduce diffusion of ozone from adjacent aqueous ozone solutions and will thus result in a higher concentration of oxidant (ozone) in solution (and in the groundwater) that would otherwise be present. This means a higher rate of contaminant destruction, extended reaction time and/or a wider radius of influence.

The proposed site can be investigated using soil borings or monitoring wells to assess the horizontal and vertical extent of any contamination to the subsurface soil and groundwater using methods known to those skilled in the art. Soil core samples can be taken to determine the extent of the smear zone which represents the area in which the groundwater height fluctuates from high to low over time. Soil core samples may be kept for determination of soil properties which may be particularly useful when direct-push technology is to be used. For example, see U.S. patent application Ser. No. 10/931,012 titled IN SITU REMEDIAL ALTERNATIVE AND AQUIFER PROPERTIES EVALUATION PROBE SYSTEM which is hereby incorporated by reference herein. A screening analysis can be performed on site using, for example, test kits, a photo-ionization detector (PID) or a gas chromatograph (GC) equipped with various detectors.

Hydraulic conductivity of the soil in the saturated zone can be estimated after a soil sieve analysis is performed. Soils may also be analyzed for total organic content, iron content and pH. Organic contamination in the smear zone can also be assessed to determine at what level the groundwater may be affected by the presence of organic contaminants in the smear zone.

In many cases it is helpful to understand the groundwater hydraulic properties prior to remediating a site. To determine these properties the groundwater elevation is gauged in one or more monitoring wells and the groundwater hydraulic conductivity is measured using slug tests or pumping tests. From the groundwater elevation and hydraulic conductivity and the estimated soil porosity, the groundwater flow direction and velocity may be calculated. The presence and extent of any light non-aqueous phase liquid (LNAPL) and any dense non-aqueous liquid (DNAPL) can be determined and may be used to select a specific injector and design. The hydraulic conductivity over both the horizontal and vertical spacial area of contamination may also be determined and can be used to choose the injector design, placement and depth.

It may be preferred to evaluate the chemical oxidant dosage requirements prior to commencing large scale remediation. This may be done, for example, on site using a field push-pull test or in a laboratory using a bench scale test. Depending on the determined oxidant demand, an oxidant or group of oxidants may be chosen. For example, a combination of ozone and persulfate has been shown to be useful when a moderate oxidant demand is indicated and a combination of ozone, persulfate and hydrogen peroxide may be used when oxidant demand is high or when a wider spectrum of contaminants are targeted. A field scale push-pull test can provide the chemical oxidant demand as well as the mass transfer and hydraulic effects under actual field conditions. For example, see U.S. patent application Ser. No. 10/931,012 titled IN SITU REMEDIAL ALTERNATIVE AND AQUIFER PROPERTIES EVALUATION PROBE SYSTEM which describes a mobile push-pull testing system.

Injection of oxidants or other materials into the saturated zone may result in "groundwater mounding" where the pressure of the injected oxidants forces the ground water up into the smear zone. The profile of this groundwater mound may be essentially that of a dome centered around the injection well. Contaminant destruction may be most efficient when the groundwater mound is forced up to the upper boundary of the smear zone. In this manner, organic compounds in the smear zone may be more readily exposed to oxidants and aqueous based oxidants may be more efficiently transported to the sites of contamination in the smear zone. In many cases, the height of the groundwater mound may be limited to the upper boundary of the smear zone to avoid transporting contaminants (e.g., LNAPL) to the unsaturated zone that may already be substantially free of these contaminants.

The measured hydraulic properties of the soil may provide some guidance as to the pressure and flow rates necessary to provide a desired groundwater mound. The height, width and profile of the groundwater mound may be empirically determined by measuring the groundwater height in injection wells or piezometers as the oxidant pressure and/or flow rate are adjusted. Pressures and flows may be adjusted, or cycled, to produce a preferred groundwater mound. The peak of a groundwater mound is typically directly above the point of injection. In many embodiments, the height of a preferred mound is at, but not above, the upper boundary of the smear zone. The cross-sectional profile of a groundwater mound typically shows the height of the mound falling off as the horizontal distance from the point of injection increases. See FIG. 2. A substantially flat profile may be preferred, as this mound formation may encompass a greater volume of the smear zone and therefore lead to greater levels of contaminant destruction.

FIGS. 1-5 illustrate a specific embodiment useful in remediating contaminated soil and/or groundwater in situ. FIG. 1 provides a plan view illustrating the hypothetical division of a remediation site into treatment cells. Rectangular treatment cell 101 can be treated efficiently by using injection couplets 102 and 103. The injection couplets may be the same or different, and in this case they each include a pair of injection wells. Injection wells 105 and 107 are constructed and arranged to inject reagents into the smear zone. Injection wells 106 and 108 are constructed and arranged to inject reagents into the saturated zone within a substantially circular area of influence. Reagents may be injected as liquids, gases or as atomized liquids. An overlap in the respective areas of influence of each couplet may result in more complete levels of contaminant destruction. Monitoring well 104 can be used to perform an initial evaluation of the site. Soil gas and/or groundwater can be used to monitor ongoing progress, and can be used to determine the level of a groundwater mound. By placing the monitoring well equidistant from both injection couplets, contaminant destruction can be monitored at a spot most likely to have the least exposure to high oxidant levels.

Figure 2:
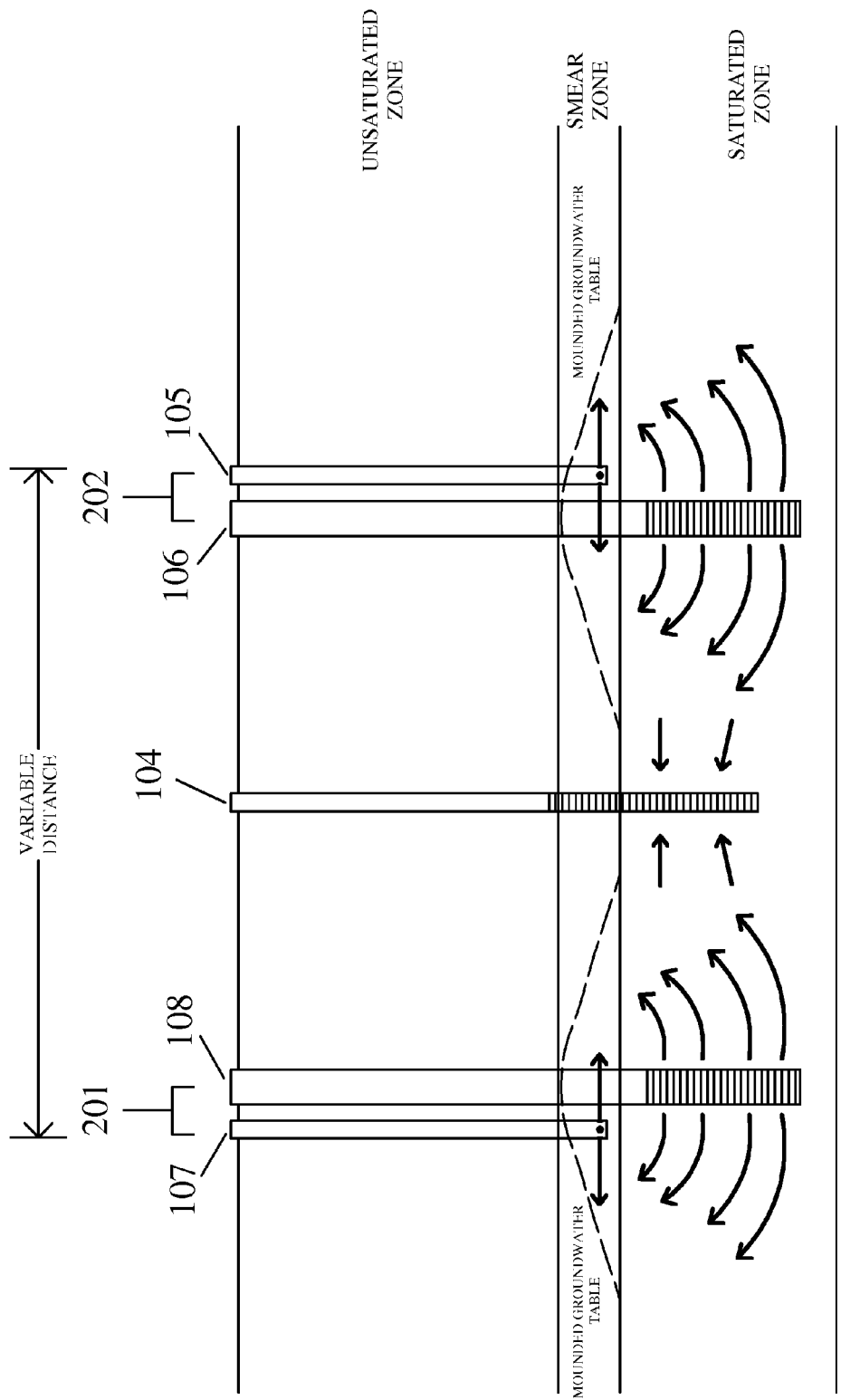
FIG. 2 provides an underground cutaway view of the system of FIG. 1.

FIG. 2 provides a cutaway view of the system illustrated in FIG. 1. Wells 106 and 108 are positioned with injection ports in the saturated zone while wells 105 and 107 are installed with injection ports in the smear zone. The height of the smear zone is dependent on the amount of movement of the water table but in many cases is between 2 and 10 feet. Thus, oxidant injected directly into the smear zone may not only destroy resident contaminants in the smear zone but may also destroy contaminants that migrate upward from the saturated zone either naturally or due to remediation activity. In alternative embodiments, both wells of a couplet may be positioned with injection ports in the saturated zone. In these cases, well 107 may be used to supply air and/or an oxidant directly to the saturated zone while well 108 may be used to supply oxidants such as persulfate and/or hydrogen peroxide to the saturated zone. When these injection ports are lowered into the groundwater (saturated zone), contaminants in the ground water may be directly targeted with a combination of persulfate, hydrogen peroxide and ozone. Well 107 may also be used for air jetting to increase the radius of influence of the oxidants provided.

Figure 3:
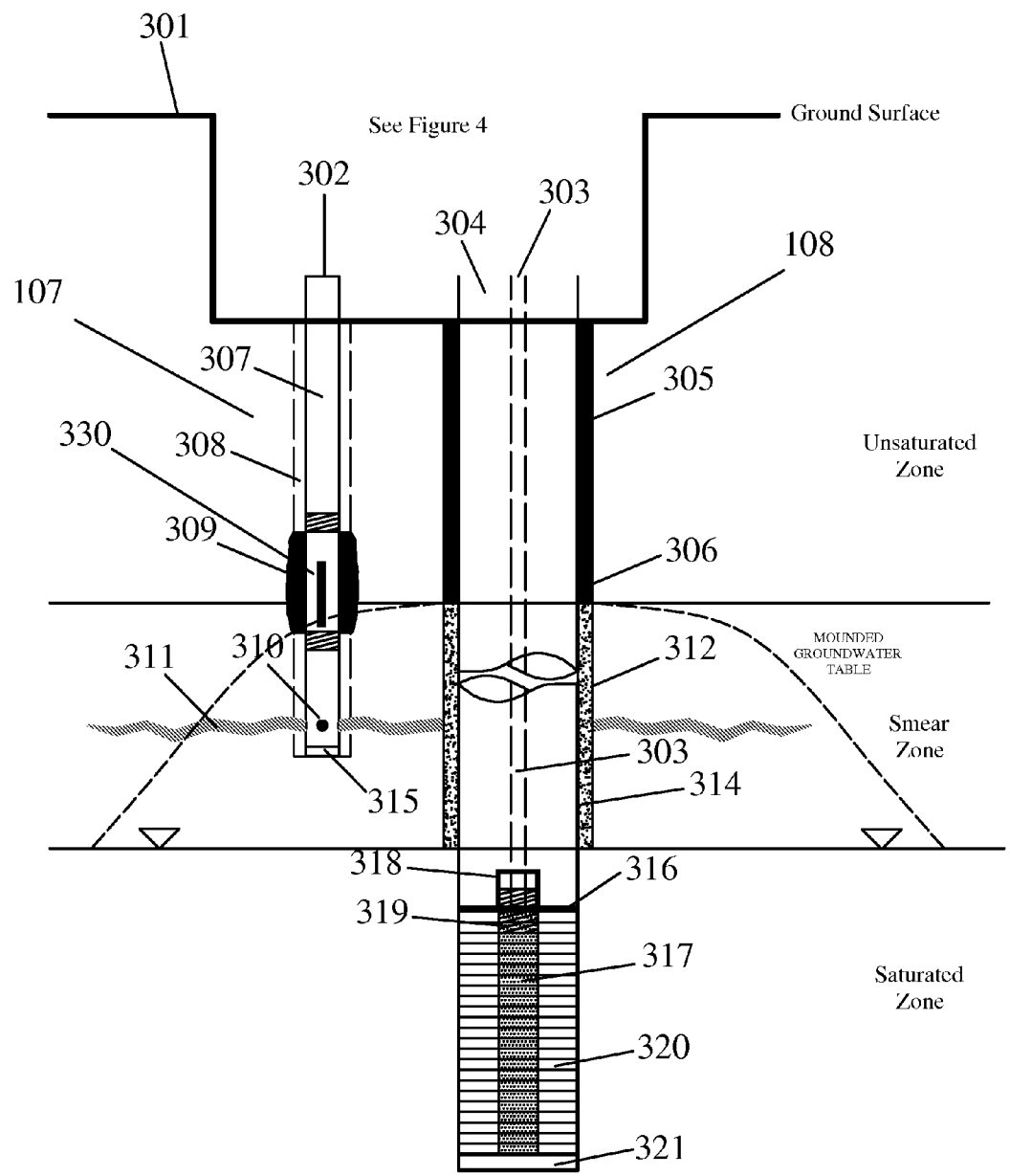
FIG. 3 provides cross-sectional views of two of the wells shown in FIG. 2.

FIG. 3 provides a cutaway cross-section view of an injection couplet of FIGS. 1 and 2. Injection wells 107 and 108 are fixed in road box 301 which has been inserted into the ground. Injection well 108 includes outer conduit 314 that may be 2 inch diameter stainless steel well pipe or other non-corrosive material. Sand backfill 312 and bentonite seal 305 secure and seal the well pipe in bore hole 306. Central conduit 303 may pass through the center of conduit 314 and may be held in place by welded perforated centralizer 316. Conduit 303 may be made of a non-corrosive material capable of withstanding constant flow of pressurized ozone, for example, PTFE. Locknut 318 secures conduit 303 to a 1 inch Schuma diffuser 317 via threaded connector 319. Well pipe 314 is extended by 2 inch #10 SS slot well screen 320 and conduit 304 is terminated by threaded stainless steel end cap 321. End cap 321 forces any material entering conduit 304 to exit through well screen 320. Any material passing through diffuser 317 is also forced to pass through well screen 320 before entering the saturated zone.

Injection well 107 terminates in the smear zone (although in other embodiments it may enter the saturated zone) and includes a corrosion resistant 1 inch stainless steel tube 307 that forms conduit 302 which can transport corrosive oxidizers such as ozone, persulfate and/or hydrogen peroxide. Seal 309 may be bentonite or an inflated borehole packer, for example, and forms a seal between borehole 308 and corrosion resistant pipe 307. The steel tube is terminated by threaded end cap 315. Nozzle 310 can be used to deliver oxidants at a preset or variable rate and may also be used to deliver a burst of air during an air jetting step to produce a soil fissure 311. Repeated air jetting may improve the migration of any oxidants (e.g., hydrogen peroxide or persulfate) that are injected after the jetting procedure. This procedure may aid in mixing oxidants provided via well 108 with ozone that is provided via well 107. A similar mixing process can occur when both injectors (310 and 317) are positioned in the saturated zone, which may be used, for instance, when low permeability soil is encountered.

Figure 4:
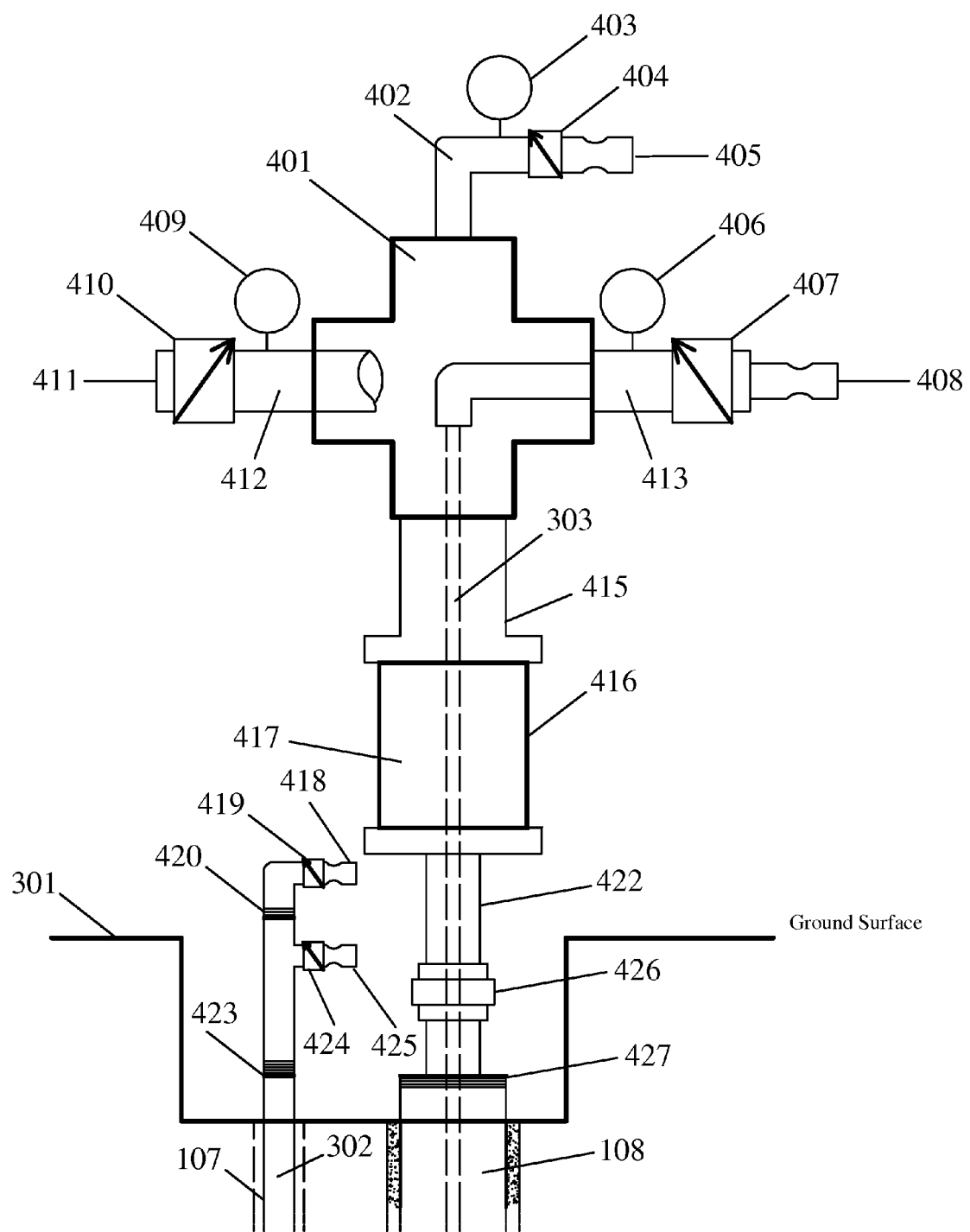
FIG. 4 provides a cross-sectional side view of the manifold system accompanying the wells of FIG. 3.
Figure 5:
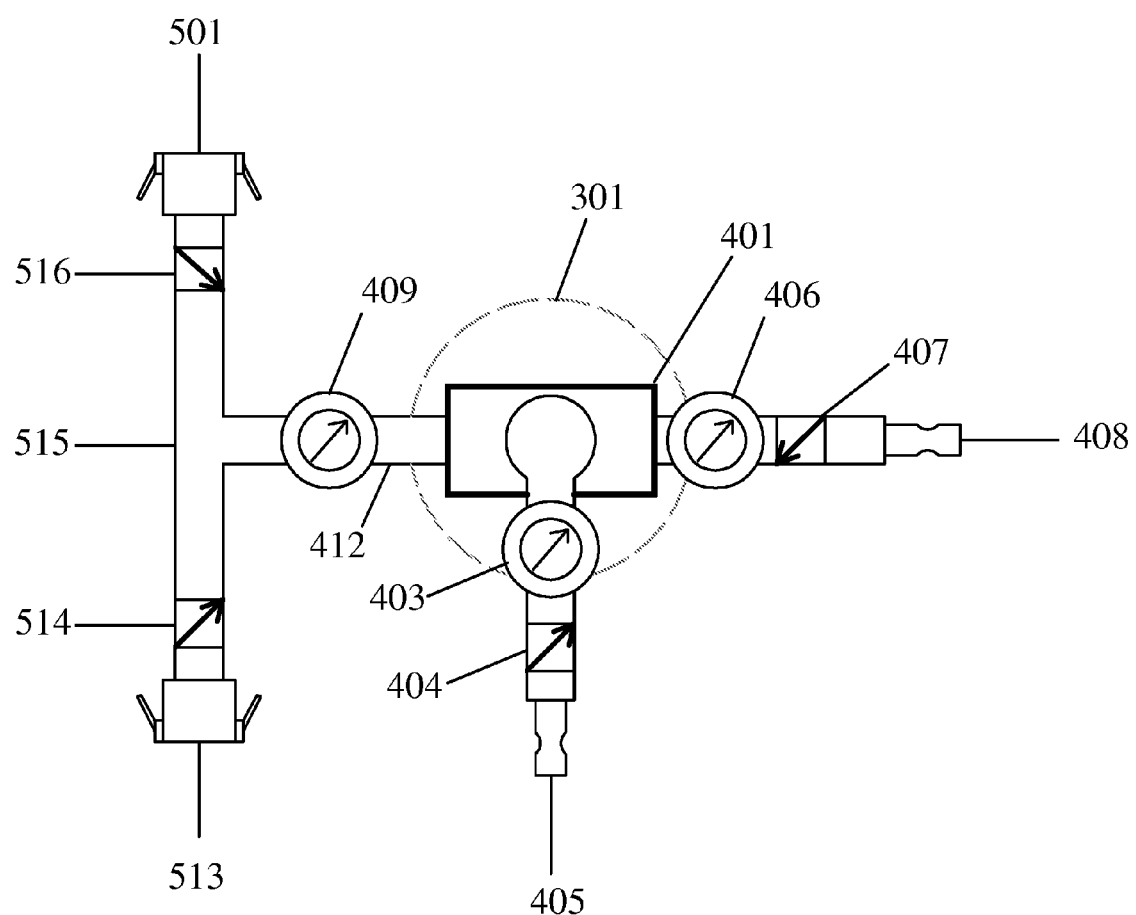
FIG. 5 provides a cross-sectional top view of the manifold system of FIG. 4.

FIGS. 4 and 5 provide illustrations of the valving and control mechanisms to operate the system shown in FIGS. 1-3. Any or all reagent flows may be computer controlled, for instance, by using a Programmable Logic Controller (PLC) and appropriately selected valves and gauges. Well pipe 107 is joined to injector inlet 425 by threaded connection 423 and in turn is joined to injector inlet 418 by threaded connector 420. Check valves 419 and 424 prevent backflow of fluids injected into the well. For instance, air may be delivered through inlet 418 while ozone is delivered at inlet 425. The two fluids may then be mixed in conduit 302 and delivered to nozzle 310.

Well 108 includes two coaxial conduits for carrying multiple reagents to the saturated zone. The well casing is joined to stainless steel pipe 422 by well thread joint 427. Mixing chamber 417 provides a region for the mixing of oxidants and/or air. Sight chamber 416 provides visual access to the mixing process. Pipe 415 joins chamber 417 to cross 401. Pipe 402 connects inlet 405 to cross 401 while check valve 404 and pressure gauge 403 can be used to monitor and control the flow of fluid into cross 401. Similarly, inlet 411 is connected to cross 401 by pipe 412. Check valve 410 and pressure gauge 409 serve to monitor and control the flow of fluid into the system from inlet 411. Inlet 408 provides feed to conduit 303 via pipe 413 and is in line with check valve 407 and pressure gauge 406.

As shown in FIG. 5, inlet 411 (FIG. 4) may be plumbed to two additional inlets 501 and 513 that may be used to feed multiple oxidants to cross 401. Check valves 516 and 514 control backflow through these two inlets. Pipe 515 feeds the fluids from inlets 501 and 513 to pipe 412 and then to cross 401.

The various inlets and pathways can be used to carry a variety of oxidants and carrier fluids. In a preferred embodiment, inlet 408 can be used to provide ozone to the lower injector, inlet 405 can be used to provide air, inlet 501 can provide hydrogen peroxide and inlet 513 can provide persulfate. Thus, a mixture of persulfate and hydrogen peroxide can be delivered to pipe 412 and subsequently to cross 401 where it can be mixed with air entering via inlet 405. Ozone entering inlet 408 can be carried to diffuser 317 via conduit 303 without mixing with the air/persulfate/hydrogen peroxide mixture.

The system described in FIGS. 1-5 was used to remediate a site contaminated with gasoline including MTBE. The site had been previously treated using hydrogen peroxide only and high residual concentrations of MtBE remained. The following procedure was used:

The injection rate and radius of hydraulic influence were estimated for the site so that the site could be divided into treatment cells as shown in FIG. 1. In this case, treatment cells measured 15 ft×30 ft. A pair of injector couplets was installed at the site as shown in FIG. 1. The couplets were placed approximately 15 feet from each other with a monitoring well positioned between the two couplets. The terminal end of well 108 was placed in the saturated zone while the terminal end of well 107 was positioned in the smear zone. The depths of each zone had been previously determined using soil and water samples, as describe above.

The smear zone was air jetted using blasts of high volume and high pressure (e.g., 100 psi) air through injector nozzle 310. This was repeated periodically throughout the remediation. Ozone, at a rate of 3.2 lbs/day was then flowed via inlet 302 to nozzle 310 and blanketed the smear zone. The parameters for sequential air jetting steps are provided in Table 1, below.

tion with ozone at 3.2 lbs/day. The flow of persulfate and hydrogen peroxide was adjusted to produce a groundwater mound extending to, but not above, the upper boundary of the smear zone. Groundwater level was monitored in injection well 107 which was equipped with water level sensor 330 positioned at the top of the smear zone. When the groundwater mound reached the sensor, the flow of persulfate and peroxide and air was attenuated to maintain the groundwater mound at that level. Ozone was pumped into inlet 408 and passed through Schuma diffuser 317 before exiting through well screen 320 into the groundwater. The ozone exited the diffuser in bubbles having a diameter of about 20 μm. Pressurized air was provided to inlet 405 and was mixed with persulfate and hydrogen peroxide in cross 401. The air/persulfate/hydrogen peroxide mixture was delivered through annular conduit 304 and passed through well screen 320 into the ground water. The ozone was supplied to conduit 303 at a pressure of 42 psi while the air was provided to conduit 304 at a pressure of about 40 psi, slightly less than that of the ozone. By operating conduit 303 at a slightly higher pressure than conduit 304, the fluid carried by central conduit 303 can exit the system without backflow issues that might occur in the absence of this pressure difference. The pressurized air may also help to prevent the ozone from diffusing out of the water in which it is carried. It may be preferred to program the system so that the air flow to the saturated zone must be turned on when ozone is flowing in the central conduit. In this way, ozone is prevented from entering the annular conduit and instead is directed outwards through the injector screen. Air and/or ozone may be cycled or pulsed in order to achieve desired destruction levels and a desired groundwater mound. Preferably, the ozone and/or air are supplied at a constant rate that results in groundwater mound that is constantly near the upper boundary of the smear zone. An example of a 60 minute injection cycle is summarized in table 2, below. An "X" means that the indicated reagent was turned on. The absence of an X indicates that the flow was turned off for the indicated

TABLE 1

Air Jetting

| Step | Procedure | Location in FIGS | Duration | Flow Rate | Pressure |
|---|---|---|---|---|---|
| 1 | Collect VOC concentration daily in Monitoring Point | 104 | | | |
| 2 | Review geotechnical parameters for air jetting feasibility | | | | |
| 3 | Air pulse | 105, 310 | 20 sec | <800 scfm | 100 psi |
| 4 | Read pressure pulse at monitoring point | 104 | | | |
| 5 | Air pulse | 107, 310 | 20 sec | <800 scfm | 100 psi |
| 6 | Read pressure pulse at monitoring point | 104 | | | |
| 7 | Assess fissure extent | | | | |
| 8 | Introduce ozone gas | 310 | Continuous | 40 scfh | 42 psi |
| 9 | Repeat air pulse periodically | 105, 107, 310 | 20 sec | <800 scfm | 100 psi |
| 10 | Start system injection in groundwater and optionally continue air pulse to smear zone and constant O₃ gas flow to smear zone. | 105, 106, 107, 108 | | | |

After the blanket of ozone was resident in the smear zone, the lower injector (in the saturated zone) was activated by adding liquid oxidants persulfate and hydrogen peroxide through inlets 513 and 501, respectively. Persulfate was provided at a concentration of 35 g/L and ozone at 3.2 lbs/day. Subsequently, hydrogen peroxide was provided at 3.5% soluperiod of time. This resting step is believed to provide time to allow the oxidizers to react with the contaminants without simply displacing the contaminated groundwater. Continuous injection of aqueous reagent without a resting step may move more contaminated groundwater than it remediates. In most cases, this movement, or displacement, is to be avoided.

The injection cycle shown in Table 2 resulted in a groundwater mound consistently close to the upper boundary of the smear zone.

ide and contaminated groundwater from a site in Somerville, Mass. Each vial was spiked with MtBE to a concentration of 28.9 mg/L. Persulfate was provided at a concentration of 40 g/L, ozone at 20 mg/L and hydrogen peroxide at 125 mg/L. Reagents were allowed to react with the sample at ambient temperature (20° C.) for 24 hours and then the vials were quenched at 4° C.

TABLE 2

60 Minute Injection Cycle

| Step | Time From T = 0 | Duration (min) | Air Smear Zone | Air Saturated Zone | Ozone Smear Zone | Ozone Saturated Zone | Persulfate Saturated Zone | Hydrogen Peroxide Saturated Zone |
|---|---|---|---|---|---|---|---|---|
| 1 | 0-10 min | 10 | X | X | X | X | X | X |
| 2 | 10-15 min | 5 | X | X | X | X | | |
| 3 | 15-25 min | 10 | X | X | X | X | X | X |
| 4 | 25-30 min | 5 | X | X | X | X | | |
| 5 | 30-40 min | 10 | X | X | X | X | X | X |
| 6 | 40-45 min | 5 | X | X | X | X | | |
| 7 | 45-55 min | 10 | X | X | X | X | X | X |
| 8 | 55-60 min | 5 | X | X | X | X | | |
| — | Injection Cycle Time | 60 | 60 | 60 | 60 | 60 | 40 | 40 |

All flow rates for air and oxidants and volume of oxidants were measured and recorded. The ozone concentration at monitoring well 104 was measured by collecting vapor samples from the well and analyzing them for ozone concentration to assure that an adequate supply of ozone was blanketing the smear zone. Groundwater samples were also periodically analyzed for temperature, pH, ORP, peroxides and sulfate to assess the distribution of oxidants in the groundwater. Based on these results, volumes of each oxidant were adjusted to assure continued destruction of resident organic contaminants. After 20 days of steady state operation, the system was shut down and after 7 days and 30 days, ground water samples from monitoring well 104 were collected and laboratory analyzed for MTBE. This process was repeated until contaminant target levels of less than 70 μg/L in ground- The results are summarized in Table 3, below, and in FIG. 6. Under the experimental conditions shown, at 30° C. complete destruction of MtBE was achieved with each reagent set except for ozone and ozone/$H_2O_2$. However, at 20° C. a significant improvement in MtBE destruction was achieved by the combination of $Na_2S_2O_8+O_3$ and the combination of $Na_2S_2O_8+O_3+H_2O_2$ when compared to the other reagents. This indicates that the use, in situ or ex situ, of one of these combinations of reagents will provide significantly improved results over any one of these reagents alone at a temperature of about 20° C.

TABLE 3

Degradation of MtBE with combinations of $Na_2S_2O_8$, $H_2O_2$, and $O_3$ at 20° C. and 30° C.

| | | | 20° C. | | 30° C. | |
|---|---|---|---|---|---|---|
| Vial No. | Oxidant(s) | $[MtBE]_{o(mg/L)}$ | $[MtBE]_{24\,hrs(mg/L)}$ | % Degradation | $[MtBE]_{24\,hrs(mg/L)}$ | % Degradation |
| 7 | $Na_2S_2O_8$ | 28.9 | 16.8 | 42% | 0 | 100% |
| 8 | $Na_2S_2O_8 + H_2O_2$ | 28.9 | 11.9 | 59% | 0 | 100% |
| 9 | $O_3$ | 28.9 | 16.4 | 43% | 25.5 | 12% |
| 10 | $O_3 + H_2O_2$ | 28.9 | 17.9 | 38% | 24.1 | 17% |
| 11 | $Na_2S_2O_8 + O_3$ | 28.9 | 5.94 | 79% | 0 | 100% |
| 12 | $Na_2S_2O_8 + O_3 + H_2O_2$ | 28.9 | 7.84 | 73% | 0 | 100% | water were achieved. Subsequent samples are scheduled to be taken at quarterly intervals to evaluate any contaminant "rebound" that may occur. If rebound does occur, the system may be re-started as described above.

Experimental Results

To evaluate the effectiveness of one embodiment of the invention a bench top experiment was designed and completed to determine the relative destruction efficiency of a persulfate/ozone and a persulfate/hydrogen peroxide system as well as the combination of all three of these oxidants.

The experiments were conducted by charging a 40 mL VOA vial (zero headspace) with a stock solution of persulfate, ozone, distilled-deionized water (DDI) hydrogen perox- While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

All references, patents and patent applications and publications that are cited or referred to in this application are incorporated in their entirety herein by reference.

What is claimed is:

1. A method of reducing the concentration of an organic contaminant in soil, the method comprising:
    buffering at least one of a persulfate solution and a hydrogen peroxide solution to a pH greater than 5.0; and
    introducing the persulfate solution, the hydrogen peroxide solution and ozone into a saturated zone to oxidize at least a portion of the organic contaminant.

2. The method of claim 1 wherein the persulfate, hydrogen peroxide and ozone are introduced simultaneously.

3. The method of claim 1 wherein the persulfate, hydrogen peroxide and ozone are introduced sequentially.

4. The method of claim 1 wherein the persulfate is introduced first and the ozone and hydrogen peroxide are introduced subsequently.

5. The method of claim 1 wherein the organic contaminant comprises at least one of volatile organic compounds, semi-volatile organics (SVOC's) polychlorinated biphenyls (PCBs); chlorinated volatile organic contaminants (CVOCs), benzene, ethylbenzene, toluene, xylene, methyl tert butyl ether (MTBE), tertiary butyl alcohol (TBA), 1,4 dioxane, polynuclear aromatic hydrocarbons (PAHs), and ethylene dibromide (EDB).

6. The method of claim 1 wherein the organic contaminant comprises at least one of tetrachloroethene (PCE), trichloroethene (TCE), trichloroethane (TCA), dichloroethane (DCA), methylene chloride, carbon tetrachloride, dichloroethene (DCE) and vinyl chloride.

7. The method of claim 1 wherein the organic contaminant comprises an herbicide and/or pesticide.

8. The method of claim 1 wherein the organic contaminant comprises a hydrocarbon.

9. The method of claim 1 wherein the persulfate, peroxide and ozone are introduced through a common well.

10. The method of claim 1 further comprising sparging the saturated zone.

11. The method of claim 1 wherein the buffering comprises a phosphate buffer.

12. The method of claim 1 wherein the soil is treated in situ.

13. The method of claim 12 further comprising heating the soil.

14. A method of reducing the concentration of an organic contaminant in water, the method comprising:
    buffering at least one of a persulfate solution and a hydrogen peroxide solution to a pH greater than 5.0; and
    introducing the persulfate solution, the hydrogen peroxide solution and ozone into the water to oxidize at least a portion of the organic contaminant.

15. The method of claim 14 wherein the persulfate, peroxide and ozone are introduced simultaneously.

16. The method of claim 14 wherein the persulfate, peroxide and ozone are introduced sequentially.

17. The method of claim 14 wherein the persulfate is introduced first and the ozone and hydrogen peroxide are introduced subsequently.

18. The method of claim 14 wherein the organic contaminant comprises at least one of polychlorinated biphenyls (PCBs); chlorinated volatile organic contaminants (CVOCs), benzene, ethylbenzene, toluene, xylene, methyl tert butyl ether (MTBE), tertiary butyl alcohol (TBA), polynuclear aromatic hydrocarbons (PAHs), ethylene dibromide (EDB); 1,4 dioxane.

19. The method of claim 14 wherein the organic contaminant comprises at least one of tetrachloroethene (PCE), trichloroethene (TCE), trichloroethane (TCA), dichloroethane (DCA), methylene chloride, carbon tetrachloride, dichloroethene (DCL) and vinyl chloride.

20. The method of claim 14 wherein the organic contaminant comprises an herbicide or pesticide.

21. The method of claim 14 wherein the organic contaminant comprises a hydrocarbon.

22. The method of claim 14 wherein the water is treated ex situ.

23. The method of claim 14 wherein the water is treated in situ.

24. The method of claim 14 further comprising heating the water.

25. The method of claim 1 wherein the ozone is introduced as an aqueous solution.

* * * * *